Aug. 27, 1929.  E. HARMES  1,726,024
MOLDING MACHINE
Filed Oct. 21, 1926  4 Sheets-Sheet 1

Fig. 1.

Inventor
EDWARD HARMES.
By Joseph W. Hazel
Attorney

Patented Aug. 27, 1929.

1,726,024

UNITED STATES PATENT OFFICE.

EDWARD HARMES, OF WILKINSBURG, PENNSYLVANIA, ASSIGNOR TO NEW PROCESS MULTI-CASTINGS COMPANY, A CORPORATION OF NEW JERSEY.

MOLDING MACHINE.

Application filed October 21, 1926. Serial No. 143,263.

The present invention relates to foundry molding machines.

An object of the invention is to provide a machine having cylinder and piston pattern drawing means for drawing the pattern at the moment or position of greatest rigidity or grip of the cylinder on the piston.

Another object of the invention is to provide such a machine with means for supporting and lifting a flask and pattern, the flask and pattern being so carried by the supporting means that they have free vertical reciprocating movement with respect thereto.

Another object of the invention is to provide such a machine in which the flask and pattern are rotatable for the purpose of inverting the flask with respect to said supporting means.

A further object is to provide such a machine in which a plurality of flask parts are carried by supporting means and include, for example, cope and drag sections which are movable vertically with respect to each other and the pattern, one of the flask sections, for example the cope, being independently rotatable for purposes of inspection or to facilitate the setting of cores.

A still further object of the invention is to provide a molding machine including a pattern plate which is vertically movable with respect to the flask part or parts, which is rotatable with said flask parts, and which is also movable clear of the flask parts to permit the mold to be closed.

An additional object of the invention is to provide the foregoing mechanism in a machine together with a jarring table and also a squeeze head, the latter being movable to a position over the flask for packing sand therein and also movable to a position clear of the flask to permit it to be filled with sand.

Another object is to provide mechanism in connection with the foregoing construction for locking the flask parts as a unit in either upright or inverted position, this locking means, in addition to maintaining the flask parts in either of such positions when they are lifted off the jarring table, also permitting the flask parts as a unit to be jarred or reciprocated vertically with respect to the flask supporting means.

A further object is to provide means for locking one of the flask parts, for example the cope, in partially rotated position with respect to the pattern plate and the other flask part to maintain it in suitable position for inspection or setting cores.

A further object of the invention is to provide the foregoing means and mechanism in a construction in which a single flask is embodied in the machine and forms a permanent part thereof during the making of a plurality of molds, the machine including means for stripping the flask from each mold.

Other and further objects of the invention will appear from the following description taken in connection with the accompanying drawings, which illustrate, by way of example, a preferred embodiment of the invention, but which are not to be taken as a definition of the limits thereof, reference being had to the appended claims for that purpose.

Referring in detail to the drawings, on the base 11 is carried the jarring table cylinder 12, within which reciprocates the jarring table piston 13 carrying at its top the jarring table 14 provided on its under side with a plurality of raised jarring bosses adapted for impact against similar raised jarring bosses provided on the stationary top frame of the jarring table mechanism, this construction facilitating the clearance of sand between the jarring table and its stationary impact member. At one corner of the jarring table 14, a vertical bearing 17 is provided or formed for the reception of a short vertical shaft 18, to the upper end of which is attached the jarring table face plate 19, provided on its under side with a plurality of raised sand clearing bosses 20 adapted to support the flask in jarring. The face plate 19 may be conveniently provided with a projecting handle 22, by means of which it may be swung in a horizontal plane about its axis 18 for the purpose of swinging a completed mold clear of the machine for convenient removal therefrom. An automatic jarring valve 25 and reversing rod 26 are preferably provided and these may be constructed in accordance with the corresponding valve shown and described in my copending application Serial No. 142,167, filed October 18, 1926.

Adjacent to the jarring table and its associated mechanism there is fixed, with respect to the base 11, a vertically extending piston member 30, which, as herein shown, is hollow. The lower portion of the piston is provided in the outer surface thereof with diametrically opposite longitudinally extending grooves 33 and 34 for a purpose presently to be described. Between its ends the piston is provided with the head 31 and the upwardly extending reduced portion 32, near the upper end of which is rotatably mounted a sleeve member 35 held against vertical movement with respect to the piston by upper and lower fixed plates 37 and 38 respectively, or by other suitable means. A spring-pressed detent 39 is preferably provided in connection with the sleeve 35 to act as a stop member for the purpose of positioning the squeeze head accurately over the flask.

Figures 2, 10:
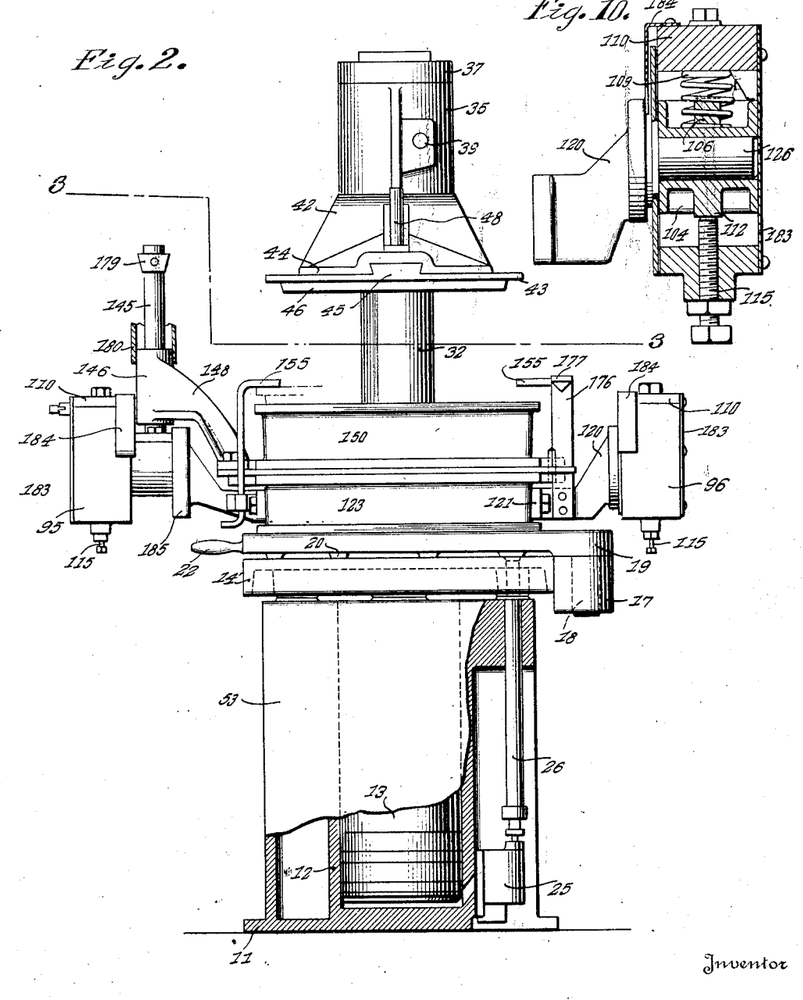
Fig. 2 is a front elevation of the machine of Fig. 1 and partly in section.
Fig. 10 is a view similar to Fig. 9, illustrating the other end of the flask mounting.

Formed on or fixed to the sleeve 35 is a squeeze head arm 42, carrying at its outer and lower end the removable squeeze head plate 43, which may be slidably secured in the outer end 44 of the squeeze head arm, as shown at 45 in Fig. 2. The squeeze head plate 43 may be provided with any suitable or desired projection 46 on its bottom face, and a plurality of forms of squeeze head plate are preferably provided with varying shapes and sizes of projections 46 in order to exert the proper packing effect on the sand used in connection with different sizes and shapes of patterns. For example, where the pattern at the center of the flask is at relatively great depth from the top edge of the flask, a central projection may be formed on the lower face of the squeeze head plate, or where the pattern is near the top of the flask at the center and at considerable depth within the flask around its inside edges, a depending tucking flange may be provided on the squeeze head plate 43. Secured in the outer end of the squeeze head arm 42, a handle 48 is provided for the purpose of facilitating the swinging of the squeeze head to operative position over the flask and to inoperative position, in a horizontal plane, to one side of the flask.

Surrounding the lower portion of the reduced part 30 of the stationary piston, and spaced therefrom, is the annular flange 51, fixed with respect to the base 11 of the machine and braced, if desired, by the web portion 52, connecting said flange with the jarring table casing 53. The upper annular face of the flange 51 acts as an abutment stop for the vertically moving cylinder and its associated parts.

Figure 1:
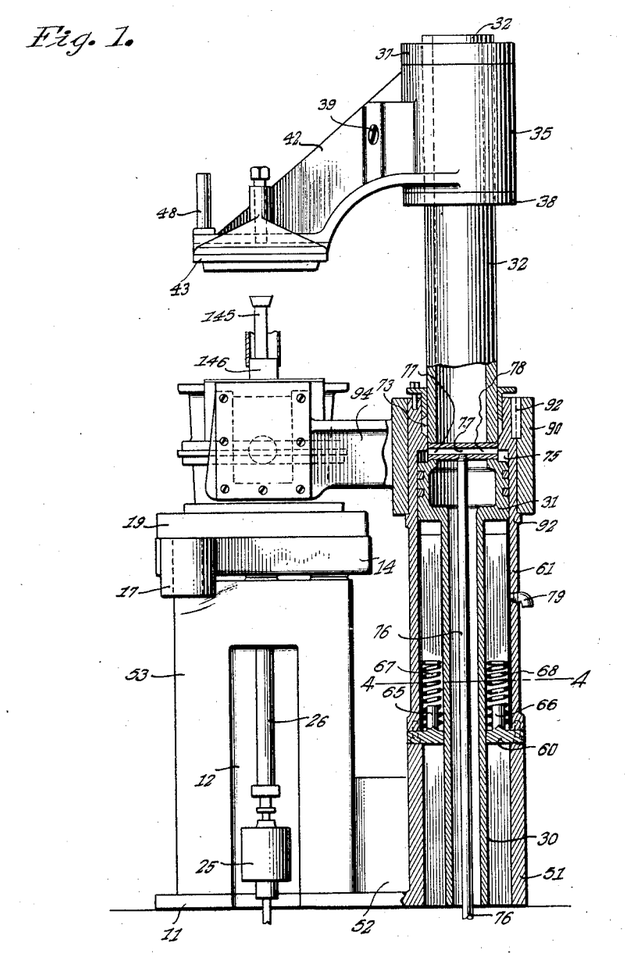
Fig. 1 is a side elevation, partly in section, of a preferred form of machine embodying the present invention.
Figure 5:
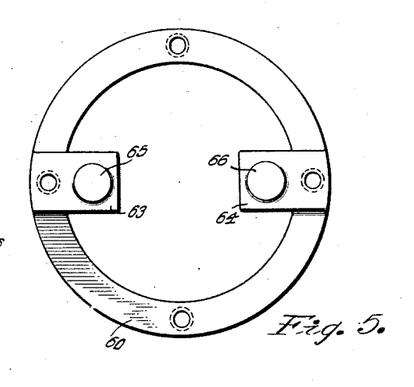
Fig. 5 is a top plan view, on an enlarged scale, of the lower cylinder plate shown in Fig. 1.

As herein illustrated, referring particularly to Figs. 1 and 5, a lower cylinder closing and abutment plate 60 is provided, which is fast to the bottom of the cylinder 61 and is provided with the diametrically opposite inwardly projecting lugs 63 and 64 adapted for vertical reciprocating cylinder-guiding movement in the grooves 33 and 34 of the piston 30. Short cylindrical projections 65 and 66 are provided on the lugs 63 and 64, encircling which are coil shock absorbing springs 67 and 68, also slidable vertically in the piston grooves 33 and 34 and adapted, near the end of the upward movement of the cylinder 61, to abut against the lower face of the piston head 31 for the purpose of decelerating the cylinder 61 as it approaches the limit of its upward movement, thereby bringing it to a gradual stop without jarring.

The upper end of the cylinder 61 encloses the piston head 31 and is provided with suitable air-tight packing 73 around the upper portion 32 of the piston and forming with the piston head 31 an expansible chamber 75, into which air or other fluid under pressure is admitted through pipe line 76 and branches 77 and 78 extending through the piston wall and leading into the expansible chamber 75. A hollow exhaust plug 79 is preferably provided extending through the cylinder wall for the purpose of causing an automatic exhaust of air from the chamber 75 when the cylinder has been lifted to a predetermined height and the exhaust port or plug 79 arrives beyond the upper face of the piston head 31.

Figure 3:
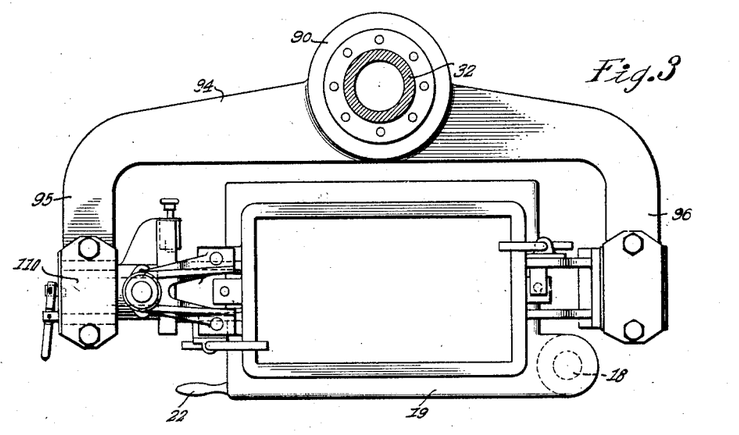
Fig. 3 is a sectional view taken on the line 3—3 of Fig. 2.
Figure 4:
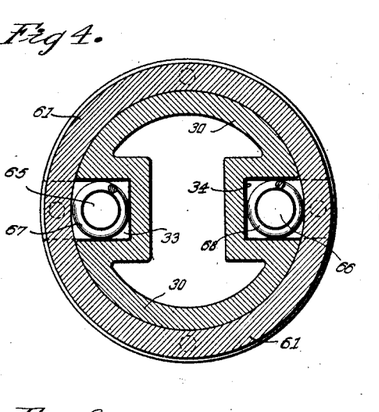
Fig. 4 is a horizontal sectional view, on an enlarged scale, taken on the line 4—4 of Fig. 1.

The vertically movable cylinder 61 is adapted to raise and lower the flask parts, pattern plate and associated mechanism, and for this purpose a sleeve member 90 is fixed to the cylinder 61 resting on the annular shoulder 92 thereof and keyed thereto, as at 92, to prevent rotation of the sleeve 90 with respect to the cylinder. Formed on or secured to the sleeve 90 is the flask carrying member herein shown (see Fig. 3) as being in the form of a yoke 94 having substantially parallel arms 95 and 96.

Referring now particularly to Figs. 3, 8, 9 and 10, each of the arms 95 and 96 is provided at its outer end with the vertical guide bearing 103, within which is adapted to reciprocate vertically a jarring guide block 104. Each guide block is provided at its top with a projection 106, about which is located a coil compression spring 109, bearing against the top retaining plate 110 covering each guide bearing. An abutment lug 112 is provided at the bottom of each guide block 104 which is adapted to rest upon an adjustment screw 115 when the cylinder 61 raises the flask above the jarring table. When the flask rests upon the jarring table, the cylinder 61, yoke 94 and the screws 115 carried in the outer ends of said arms are so positioned that the whole weight of the flask is carried on the jarring table, and the adjustment plugs are spaced from the guide blocks 104.

Referring now particularly to Fig. 10, illustrating the mounting of the flask at the right-hand side as viewed in Fig. 2, a bracket 120 is secured at 121 to the cope part 123 of the flask. The bracket 120 is provided with the trunnion 126, which is rotatably received within the guide block 104.

Figures 8, 9:
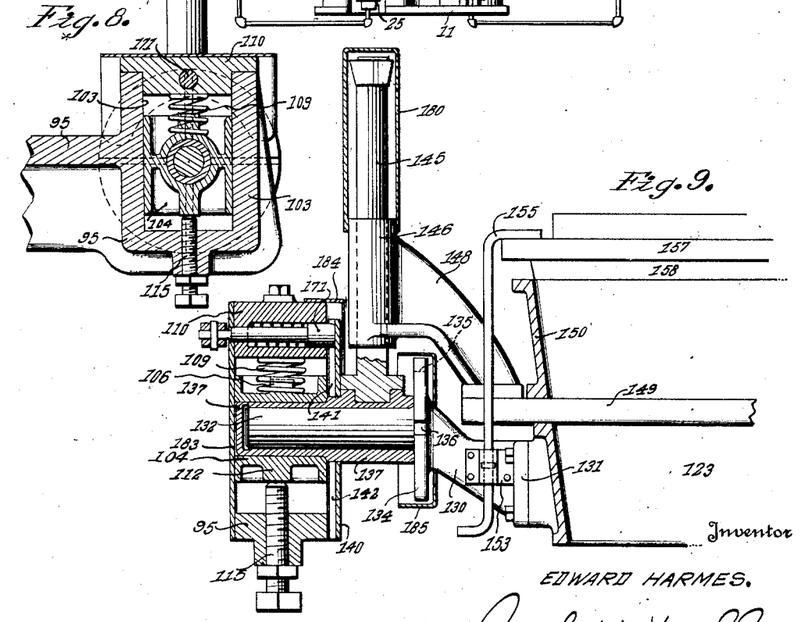
Fig. 8 is a vertical sectional detail view, illustrating the mounting of the flask in its support.
Fig. 9 is a vertical sectional view taken at right angles to Fig. 8 and partly broken away, further illustrating the mounting of the flask parts and pattern plate.

Referring now particularly to Figs. 8 and 9 and the flask mounting mechanism shown at the left-hand side of Fig. 2, a bracket 130 is secured at 131 to the cope 123 and is provided at its outer end with the trunnion 132. At the inner end of the trunnion, between it and the bracket 130, is provided a locking disc 134, provided at its outer edge with two locking notches 135 and 136 for a purpose presently to be described.

The trunnion 132 is rotatably received within a sleeve 137, which in turn is rotatably mounted in the guide block 104. It will be apparent that by this construction the trunnion may revolve in the sleeve, or the trunnion and sleeve may rotate in the guide block. Adjacent the inner face of the arm 95, the sleeve 137 is provided with the locking disc 140 fixed thereto and which is provided on its outer face with two locking grooves 141 and 142, which are 180° apart. Fixed to the sleeve 137 is a pattern plate guide rod 145, upon which is mounted, for rotation and axial movement thereon, the sleeve portion 146 of the pattern supporting bracket 148, carrying at its other end the pattern plate 149.

As shown in Fig. 9, in the inverted position of the flask, the pattern plate 149 is resting on the cope 123, and the drag 150 is supported and positioned on the pattern plate. On the bracket 130 is provided a supporting bearing 153 for a bottom board retaining hook 155, adapted to hold the bottom board 157, provided with the flask entering projection 158, upon the drag 150.

Figure 6:
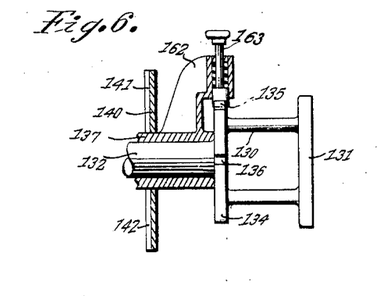
Fig. 6 is a top plan view, partly in section, of one form of cope locking means.

Means are provided for locking the disc 134, and consequently the cope 123 and trunnion 132, to the sleeve 137 for rotation therewith when the sleeve 137 rotates in the guide block 104. As herein shown and referring particularly to Fig. 6, the sleeve 137 is provided with the locking detent bracket 162, carrying in its outer end the spring-pressed locking detent 163, adapted to enter either of the notches 135 or 136 in the locking disc 134. When the flask is in its upright position and the pattern has been drawn as hereinafter described, by releasing the detent 163 from the holding notch in disc 134, the cope 123 may be rotated, as herein shown, 90° with respect to the drag, thus bringing the interior of the cope into view for inspection and the setting of any cores which might be required. In this partially rotated position, the cope 123 is locked by the detent 163 in the other locking notch.

The invention provides means for locking the flask parts in upright or inverted position and at the same time permitting vertical movement of the flask with respect to the yoke 94. In the form shown, there is provided in the cover plate 110 (see Fig. 9) the spring-pressed detent 171, which is adapted in the upright position of the flask to enter the groove 142, and in the inverted position of the flask to enter the groove 141, thus locking the flask in either of these two positions while permitting vertical movement of the flask and guide blocks 104 in the arms 95 and 96.

Secured on the bracket 120 (Fig. 2) and parallel with the rod 145 is a pattern guide and rest 176 having a horizontal portion 177. The horizontal portion 177 is preferably beveled, as shown in Fig. 2, for the purpose of preventing the lodging of any sand thereon. The rod 145 is provided with the pattern bracket sleeve abutment head 179, which may be beveled or cone shaped, as shown in Fig. 2, to prevent the accumulation of any sand thereon, or may be provided with the closed casing 180 (Fig. 9) for the same purpose.

A sand guard plate 183 is provided on the outer face of each of the arms 95 and 96 to close the guide bearings thereof to protect them against sand. Inwardly extending sand guards 184 are also provided to protect the inner faces of the arms opposite the guide bearings. A sand protecting guard 185 is preferably provided for the locking disc 134.

Figure 7:
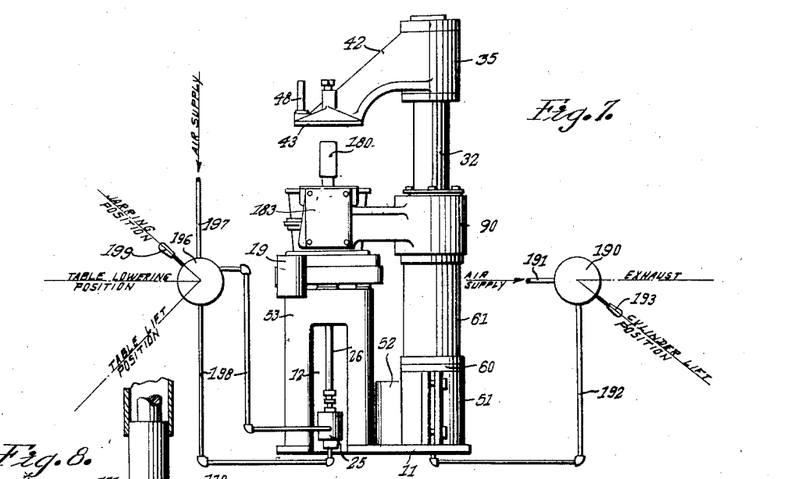
Fig. 7 is a side elevation of the machine on a reduced scale and showing the air supply lines and control valves for operating the machine.

Referring to Fig. 7, a valve 190 is provided having an air inlet 191, an exhaust, and a supply pipe line 192 leading to the expansible chamber 75. As shown in Fig. 7, the handle 193 of this valve is adapted to occupy either of two positions, an exhaust position and a cylinder lift position. The construction of this valve may be that shown and described in my copending application Serial No. 142,167, filed October 18, 1926. A jarring table operating valve 196 is provided having an air supply line 197 and air delivering lines 198 leading to the valve casing 25. The construction of the valve 196, as well as the jarring valve casing and associated mechanism, may also be that shown and described in my copending application Serial No. 142,167, filed October 18, 1926. As shown in Fig. 7, the jarring valve handle 199 is adapted to occupy three positions, for continuous and automatic jarring, for lifting the table without jarring, and for lowering the table to position of rest.

The operation of the machine is as follows: Assuming the flask to be in the position of Fig. 1, but the squeeze head arm moved at right angles to the position shown, the drag 150 is filled with sand. The valve 196 is operated to jar the table 14; the surplus sand is struck off the drag and a bottom board is clamped upon the filled and jarred drag. The valve 190 is then operated to lift the cylinder 61 above the jarring table sufficiently high to enable it to be rolled over. The latch 171 is released from engagement with the groove 141, and the assembled flask and pattern plate is rolled over as a unit to upright position, thus bringing the empty cope uppermost. The scope is now filled with sand and the arm 42 is swung over the filled cope, being positioned accurately thereover by the detent 39. The jarring table valve 196 is then operated to lift the table 14 without jarring. No air need be admitted into cylinder at this time. The jarring table is raised to bring the sand in the filled cope in contact with the squeeze head 45, which, as the table continues to raise the flask, presses and packs the sand in the flask, the projection 46 of the squeeze head entering the cope. At this time, also, the projection 158 (see Fig. 9) of the bottom board 157 is pressed by the table up into the filled drag to compress still further the sand packed therein by jarring. The springs 67 prevent any sudden stopping of the cylinder 61 as it is raised, to its extreme height, for roll over, but do not reach high enough to function during squeezing. During the jarring operation above referred to the inverted flask parts move upwardly and downwardly in the outer ends of the arms 95 and 96. The inverted flask parts, at the end of each jarring downward stroke, are spaced from the adjustable abutment screws 115, since the flask is resting on the table. When the flask is lifted by the cylinder 61, for the rollover, the arms 95 and 96 move upwardly, and the adjustable abutment screws 115 bear against the blocks 104, which lift the flask by means of its trunnions 126 and 132. During the squeezing operation, after the flask has been rolled over and when the table 14 lifts the flask, the springs 109 are compressed as the flask is moved upwardly in the arms 95 and 96 until the bearing blocks 104 bear against the cap plates 110, thus lifting the arms 95 and 96, and consequently the sleeve portion 90 of the yoke, together with the cylinder 61.

When the squeezing operation has been completed, the table 14 is lowered by actuating the valve 196, carrying downwardly with it the bottom board 157, whose projection 158 has been squeezed upwardly into the drag 150, the filled drag resting on the bottom board, the pattern plate 149 resting on the drag, and the filled and packed cope 123 resting on the pattern plate 149, all in upright position.

The bottom board clamps 155 now released are moved clear of the bottom board and the cylinder 61 is lifted by operating valve 190. This lifts the yoke 94 and cope 123 by its trunnions, the guide blocks 104 bearing at this time on the abutment screws 115. This upward movement lifts the cope off the pattern 149; as the cope continues to move upwardly, the pattern plate rod 145 together with the lifting bracket 176 are also drawn upwardly until the collar 179 abuts against the lower end of the pattern plate bracket 148 and at the same time the horizontal portion 177 of the pattern plate lifting bracket 176 abuts against the under side of the other end of the pattern plate. As the cope continues to move upwardly, carrying the rod 145 and bracket 176, the pattern plate will be lifted off the drag, which remains resting on the bottom board on the table 14. The pattern plate 149 is now swung in a horizontal plane away from the flask, turning about the axis 145 and riding off the horizontal plate lifting member 177. At this time the detent 171 is locked in the groove 142, thus holding the sleeve 137 fixed in the guide block 104 and preventing rotation of said sleeve with the pattern bracket 148. The detent 163 (Fig. 6) may now be released from its holding notch, and the cope 123 may be rotated 90° until the detent 163 enters the other notch, thus holding the cope with its interior freely accessible for inspection and for the setting of any cores which might be required. The cope may, upon releasing detent 163, be now brought to and locked by detent 163 in its former upright position, and the cylinder 61 is now lowered to close the mold. As the yoke 94 moves downwardly with cylinder 61, it carries downwardly with it the cope 123 until the cope rests on the drag. The sand retaining strips of the cope may now be released, and the cylinder 61 raised with the yoke 94, thus lifting the cope part of the flask and leaving the cope mold on the drag. The drag 150 may now be lifted off the mold by hand. If desired at this time the table 19 may be swung in a horizontal plane about its pivot 18 to bring the mold clear of the machine for removal, after which a pouring slip-over jacket is placed on the mold for pouring.

It will be noted that as the cylinder 61 moves upwardly to draw the pattern, the cylinder 61 has its greatest grip on its piston, and consequently the entire mechanism is in its position of greatest rigidity, thus making a smooth draw. It is also to be noted that the flask is locked either in upright or inverted position during long lift and jarring and that the cope is rotatable with respect to the drag and pattern plate. The entire flask is carried by the supporting arms 95 and 96 and the flask sections are movable vertically with respect to each other. The pattern plate itself is vertically movable with respect to the flask parts and is so arranged as to be swung aside after the pattern is drawn in order that the machine may close the mold. The machine also provides a jarring table in connection with a squeeze head, the latter being movable over the flask when in use and movable away from this position for filling the flask with sand. The invention also provides a machine embodying a single flask capable of producing any desired number of molds without requiring additional flask parts.

What is claimed is:

1. A molding machine including a jarring table, a piston member and cylinder member relatively movable with respect to each other, one of said members carrying a molding flask including a cope and a drag, and carrying a pattern plate between said cope and drag, a stationary squeeze head carrying member, and a squeeze head carried thereby and adapted to be moved into and out of position over said table.

2. A molding machine including a lifting table, a piston member and cylinder member relatively movable with respect to each other, one of said members carrying a molding flask including a cope and a drag, and carrying a pattern plate between said cope and drag, a stationary squeeze head carrying member, and a squeeze head carried thereby and adapted to be moved into and out of position over said table.

3. A molding machine including a lifting and jarring table, a piston member and cylinder member relatively movable with respect to each other, one of said members carrying a molding flask including a cope and a drag, and carrying a pattern plate between said cope and drag, a stationary squeeze head carrying member, and a squeeze head carried thereby and adapted to be moved into and out of position over said table.

4. A molding machine including a flask-lifting table, relatively movable piston and cylinder members, a molding flask including cope and drag carried by one of said members, a pattern plate movably carried between said cope and drag, a squeeze head adapted to be swung into and out of position over said table, and means for positioning said squeeze head accurately over said table.

5. A molding machine including a flask-lifting table, relatively movable piston and cylinder members, a molding flask including cope and drag carried by one of said members, a pattern plate carried between said cope and drag and rotatable with respect thereto, and a squeeze head positionable over said table for packing sand in said flask.

6. A molding machine including a flask-lifting table, relatively movable piston and cylinder members, a molding flask including a cope and drag carried by one of said members, a pattern plate carried between said cope and drag and rotatable and rectilinearly movable with respect thereto, and a squeeze head positionable over said table for packing sand in said flask.

7. A molding machine including an operating table, relatively movable piston and cylinder members, flask parts comprising a cope and drag carried by one of said members, vertically movable with respect thereto, a pattern plate carried between said flask parts, and a squeeze head positionable over said table for packing sand in said flask.

8. A molding machine including an operating table, relatively movable piston and cylinder members, flask parts comprising a cope and drag carried by one of said members and rotatable with respect thereto, a pattern plate carried between said flask parts, and a squeeze head positionable over said table for packing sand into said flask.

9. A molding machine including a flask-lifting table, relatively movable piston and cylinder members, flask parts comprising a cope and drag carried by one of said members mounted for rectilinear and rotational movement with respect thereto, a pattern plate carried between said flask parts, and a squeeze head positionable over said flask parts for packing sand thereinto.

10. A molding machine including an operating table, relatively movable piston and cylinder members, flask parts comprising a cope and drag carried by one of said members, vertically movable with respect thereto, and a pattern plate carried between said flask parts.

11. A molding machine including an operating table, relatively movable piston and cylinder members, flask parts comprising a cope and drag carried by one of said members and rotatable with respect thereto, and a pattern plate carried between said flask parts.

12. A molding machine including a flask-lifting table, relatively movable piston and cylinder members, flask parts comprising a cope and drag carried by one of said members mounted for rectilinear and rotational movement with respect thereto, and a pattern plate carried between said flask parts.

13. A molding machine including a jarring table, relatively movable piston and cylinder members, flask parts comprising a cope and drag carried by one of said members over said jarring table, and means for rotating one of said flask parts with respect to the other.

14. A molding machine including a jarring table, relatively movable piston and cylinder members, flask parts comprising a cope and drag carried by one of said members over said jarring table, and a pattern plate carried between said flask parts, said flask parts and pattern plate being relatively movable with respect to each other and with respect to said flask carrying member.

15. A molding machine including a jarring table, relatively movable piston and cylinder members, flask parts comprising a cope and drag and a pattern plate therebetween carried by one of said members over said jarring table, and relatively rectilinearly movable with respect to each other and with respect to said flask carrying member, and relatively rotatable with respect to said flask carrying member, and means mounting one of said flask parts for rotational movement with respect to the other.

16. A molding machine including a jarring table, relatively movable piston and cylinder members, flask parts comprising a cope and drag and a pattern plate therebetween carried by one of said members over said jarring table, and relatively rectilinearly movable with respect to each other and with respect to said flask carrying member, and relatively rotatable with respect to said flask carrying member, and means mounting one of said flask parts for rotational movement with respect to the other and said pattern plate.

17. A molding machine including a jarring table, relatively movable piston and cylinder members, flask parts comprising a cope and drag and a pattern plate therebetween carried by one of said members over said jarring table, said flask parts and pattern plate being relatively rectilinearly movable with respect to each other and with respect to said flask carrying member, and being rotatable as a unit with respect to said flask carrying member, means mounting one of said flask parts for rotational movement with respect to the other, and means for locking said flask part in rotated position.

18. A molding machine including a jarring table, relatively movable piston and cylinder members, flask parts comprising a cope and drag and a pattern plate therebetween carried by one of said members over said jarring table, said flask parts and pattern plate being relatively rectilinearly movable with respect to each other and with respect to said flask carrying member, and being rotatable as a unit with respect to said flask carrying member, means mounting one of said flask parts for rotational movement with respect to the other, and means for locking said flask parts and pattern plate in upright and in inverted position.

19. A molding machine including a jarring table, relatively movable piston and cylinder members, flask parts comprising a cope and drag and a pattern plate therebetween carried by one of said members over said jarring table, said flask parts and pattern plate being relatively rectilinearly movable with respect to each other and with respect to said flask carrying member, and being rotatable as a unit with respect to said flask carrying member, means mounting one of said flask parts for rotational movement with respect to the other, and means for locking said flask parts and pattern plate against rotation in upright and in inverted position while permitting rectilinear movement thereof with respect to said flask carrying member.

20. A molding machine including a jarring table, relatively movable piston and cylinder members, flask parts comprising a cope and drag and a pattern plate therebetween carried by one of said members over said jarring table, said flask parts and pattern plate being relatively rectilinearly movable with respect to each other and with respect to said flask carrying member, and being rotatable as a unit with respect to said flask carrying member, means mounting one of said flask parts for rotational movement with respect to the other, means for locking said flask part in rotated position, and means for locking said flask parts and pattern plate in upright and in inverted position.

21. A molding machine having a jarring table, a stationary piston, a vertically extending flask carrying cylinder associated therewith, flask parts comprising a cope and drag and a pattern plate therebetween carried by said cylinder, and means for drawing said pattern when the area of contact between said piston and said cylinder is at its maximum.

22. A molding machine having a flask-lifting table, relatively movable piston and cylinder members, flask parts comprising a cope and drag and a pattern plate therebetween carried by one of said members, and means for drawing said pattern when the area of contact between said piston and said cylinder is at its maximum.

23. A molding machine having an operating table, a stationary piston member, a cylinder associated therewith, flask parts comprising a cope and drag and a pattern plate therebetween carried by said cylinder, a part of said piston member passing through the head of said cylinder, and a squeeze head carried by said piston member.

24. A molding machine having a flask-lifting table, relatively movable piston and cylinder members, flask parts comprising a cope and drag and a pattern plate therebetween carried by one of said members, means locking said flask parts and pattern against removal from said member, and means for drawing said pattern when the area of contact between said piston and said cylinder is at its maximum.

In testimony whereof I affix my signature.

EDWARD HARMES.